Figure 1:
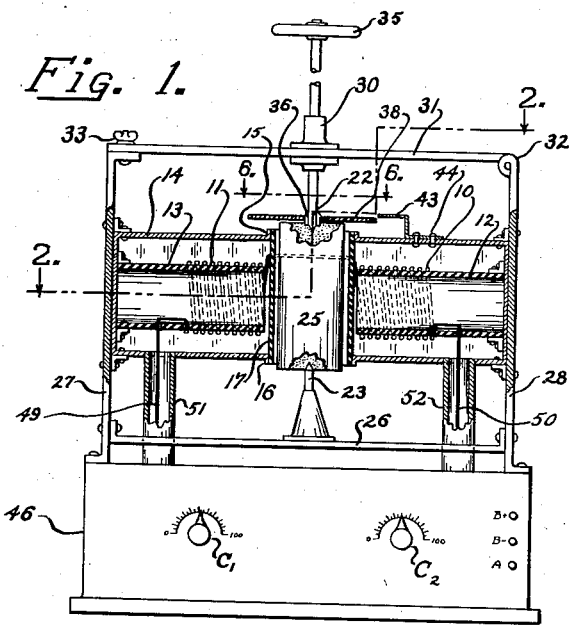

Nov. 16, 1943.  L. DILLON  2,334,393
DETERMINATION OF MAGNETIC AND ELECTRICAL ANISOTROPY
OF FORMATION CORE SAMPLES
Filed Feb. 26, 1940  2 Sheets-Sheet 1

INVENTOR
Lyle Dillon
BY
ATTORNEY

Nov. 16, 1943. L. DILLON 2,334,393
DETERMINATION OF MAGNETIC AND ELECTRICAL ANISOTROPY
OF FORMATION CORE SAMPLES
Filed Feb. 26, 1940   2 Sheets-Sheet 2

Angular Position of Core Sample

INVENTOR
Lyle Dillon
BY
Claude E. Swift
ATTORNEY

Patented Nov. 16, 1943

2,334,393

UNITED STATES PATENT OFFICE 2,334,393

DETERMINATION OF MAGNETIC AND ELECTRICAL ANISOTROPY OF FORMATION CORE SAMPLES

Lyle Dillon, San Gabriel, Calif., assignor to Union Oil Company of California, Los Angeles, Calif., a corporation of California Application February 26, 1940, Serial No. 320,843

10 Claims. (Cl. 175—183)

This invention relates to the determination of the magnetic and electrical anisotropy of solid bodies and particular to the determination of the anisotropy of the magnetic permeability of earth bodies, such as core samples recovered from drilled wells.

It has been discovered that many sedimentary earth strata have connate anisotropic magnetic properties which are present therein by reason of the inclusion during the period of sedimentation of quantities of magnetic mineral particles which oriented themselves under the influence of the earth's magnetic field at the time of sedimentation.

Certain igneous rocks also display anisotropic magnetic properties which are attributable to the oriented formation of crystals of ferro magnetic minerals during the slow cooling conditions usually attendant upon the past history of such rock formation. Whatever may be the cause, it has been discovered that many rock samples of both sedimentary and igneous origin display definitely oriented magnetic and electrical properties.

It is an object of this invention to present a method and apparatus for detecting and determining the presence and orientation of such connate anisotropic magnetic properties in earth formations.

The determination of magnetic anisotropy of such bodies by means of an astatic magnetometer is known but such methods are often limited in sensitivity and subject to error caused by the tendency of the magnetometer magnets to induce extraneous magnetic polarities within the magnetic materials comprising the earth test samples.

It is, therefore, a further object of the present invention to provide a method and apparatus for determining magnetic anisotropy of earth's strata samples which are accurate and of sufficient sensitivity to be applicable to earth samples having only slight anistropic characteristics.

The determination of the orientation of the axis of anistropy of the earth strata samples has its chief application as an aid to the determination of the dip and strike of remote or deep earth strata from which the samples have been removed, for example, deep strata from which drilled core samples have been taken in the process of oil well drilling.

It has been shown that the magnetic polar axis of recovered formation samples correspond in alignment with the same polarization of the permanent or residual magnetic fields existing in the depths of the drilled strata from which they are recovered. Therefore, having determined the magnetic axis of a core sample and with the direction of the magnetic field in the formation from which the core has been recovered known and with the vertical inclination of the bore hole from which the core has been recovered also known, the original position of the core within the stratum is established. If the thus oriented core sample shows stratification, as it often does, the dip and strike of such strata is also thus established.

The method and apparatus of the present invention, however, is in itself adapted only to the determination of the axis of magnetic anisotropy within a recovered core sample and other means must be employed to determine the actual magnetic polarity thereof. In core samples which have extremely feeble magnetic polarization it is often possible to determine the polarity once the axis of the magnetic anisotropy is accurately established.

The method of the invention comprises in brief, placing a core sample which is to be tested in inductive relation to an inductance coil and rotating the core sample into various angular positions with respect to the field of said inductance coil and, by suitable means, simultaneously observing and correlating the relative variations of the inductance or impedance of the electrical circuit comprising said inductance coil with said varied angular positions of the core sample. If the core sample possesses magnetic anisotropy the inductance coil will exhibit an inductance or impedance which is a maximum when the axis of maximum permeability of the core coincides with the axis of the field of the inductance coil and will be a minimum when the same axis is at right angles to the field of inductance. Other objects and features of the invention will be evident hereinafter.

Figure 2:
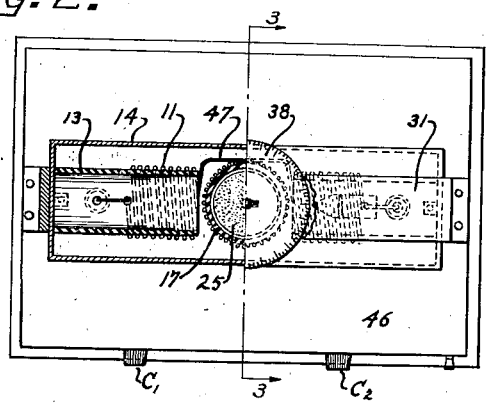
Figure 3:
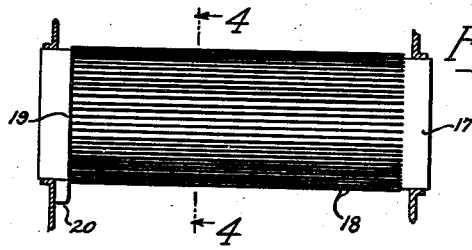
Figure 4:
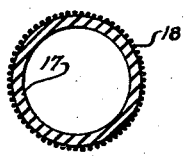
Figure 5:
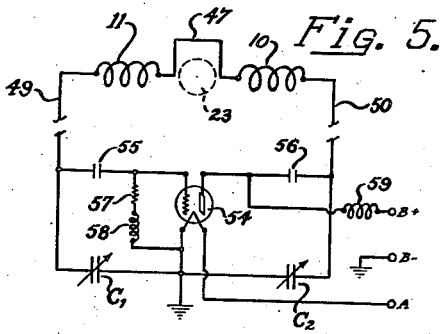
Figure 6:
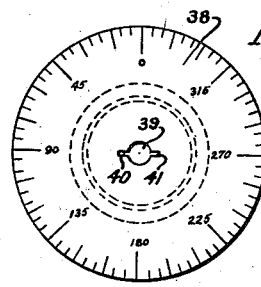
Figure 7:
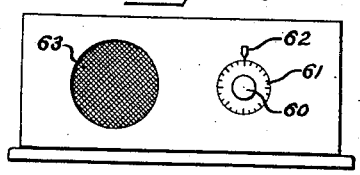
Figure 8:
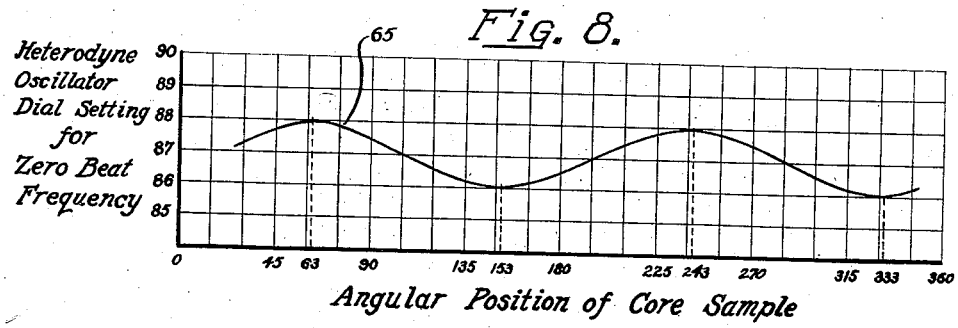

The accompanying drawings illustrate a preferred embodiment of the invention in which Figure 1 illustrates the front elevation partially in section of the general assembly of the invention. Figure 2 illustrates a plan view partially in section taken at line 2—2 of Figure 1. Figure 3 illustrates an enlarged detail view of an electrostatic shield and shield support taken on line 3—3 of Figure 2. Figure 4 is a cross section taken on line 4—4 of Figure 3. Figure 5 is a schematic wiring diagram of the electrical circuits. Figure 6 is a plan view of the core orientation dial taken approximately at line 6—6 of Figure 1. Figure 7 is a conventional heterodyne frequency meter. Figure 8 is a graph plotted from data derived from tests made in accordance with the present invention.

Referring to Figures 1 and 2, the apparatus comprises an inductance comprising a plurality of turns of wire wound in two sections, as shown at 10 and 11, upon suitable cylindrical dielectric forms 12 and 13 which are supported at the outer ends within a rectangular metallic shielding enclosure 14. The metallic enclosure 14 is provided at the central portion of the top and bottom surfaces thereof with circular openings 15 and 16 through which a cylindrical dielectric tube 17 is supported on a vertical axis. The said cylindrical dielectric tube 17 is thus supported intermediate the inner ends of the tubes 12 and 13 upon which the two sections of the inductance 10 and 11 are wound. The dielectric tube 17 carries an electrostatic shield comprising a plurality of longitudinally positioned parallel fine wires equally spaced about the outside surface as best shown at 18 in Figures 3 and 4. These wires may be attached to the outside surface of the dielectric tube 17 by suitable adhesive, such as liquid "Bakelite" (a phenol-formaldehyde condensation product) or cellulose nitrate or acetate lacquer. The wires 18 are all electrically connected at one end with a common conductor, as shown at 19, which is grounded to the shield enclosure 14, as shown at 20. The longitudinal wires 18 thus supported on the dielectric tube 17 form an electrostatic shield for the cylindrical opening which the tube 17 provides through the center portion of the enclosure 14 between the two sections of the inductance 10—11. Upper and lower pivots 22 and 23 positioned coaxially with respect to the cylindrical opening formed by the dielectric tube 17 are provided for supporting a cylindrically shaped core sample, as illustrated at 25. The lower pivot 23 is supported in a fixed position upon a horizontal member 26 which is in turn supported at its ends by means of metal uprights 27 and 28. The upper pivot point 22 is retained in a position coaxial with the tube 17 and the pivot 23 by means of a bushing 30 through which it is free to move vertically. The said bushing 30 is in turn supported by a hinged horizontal member 31 which is also supported at its ends by the beforementioned uprights 27 and 28. The said supporting member 31 is provided at one end with a hinge, as shown at 32 and with a thumb screw at the opposite end, as shown at 33, whereby it may be raised and pivoted about the hinge 32 as a center to facilitate introduction and removal of the test core sample. The pivot 22 is provided at the top with a wheel 35 by means of which it may be rotated by hand and at the lower end adjacent the point it is provided with a spade shaped member, as shown at 36, which is adapted to rest within a diametrically positioned slot cut in the end of the cylindrical core sample 25. Both of the pivots 22 and 23 are preferably composed of an insulating material, such as glass, hard rubber, "Bakelite," or other suitable dielectric, non-magnetic material.

A graduated disc 38 composed of a nonmagnetic, dielectric material, such as Celluloid is adapted to rest on the top end of the core sample, as best shown in Figure 6. The center of the disc 38 is provided with a circular opening 39 and radial slots 40 and 41 through which the pivot 22 and spade 36 pass. Slots 40 and 41 are adapted to retain the said disc 38 in a fixed rotational position with respect to the core sample 25 and are thus adapted to be rotated together with the core sample 25 by means of hand wheel 35. A pointer 43, supported at 44 on the upper surface of the metallic enclosure 14, is provided for indicating the rotational position of the core sample 25 upon the graduations of the disc 38.

The metallic enclosure 14 which houses the inductance 10—11 is supported at its outer ends by means of the before mentioned uprights 27 and 28 upon a metallic instrument box 46 which contains the vacuum tube oscillator, hereinafter described. The two sections 10 and 11 of the inductance are connected in series by means of a conductor within the enclosure 14, as shown at 47, and the said inductance is in turn connected to the vacuum tube oscillator circuit within the instrument box 46 by means of conductors 49 and 50 which pass from the enclosure 14 to the instrument box 46 through metallic shielding tubes 51 and 52. The vacuum tube oscillator circuit comprising the inductance 10—11 and the apparatus housed within the instrument box 46 is a conventional shunt fed "colpitts" type self-excited oscillator the wiring diagram of which is illustrated in Figure 5. The apparatus within the instrument box 46 comprises a three element vacuum tube 54, fixed stopping condensers 55 and 56, variable tuning condensers $C_1$, $C_2$, grid leak 57 and radio frequency chokes 58 and 59. Terminals B— and B+ are provided for connecting the oscillator circuit to a suitable high voltage plate supply which may be a dry battery of approximately 45 to 90 volts. The terminals B— and A are provided for connection to the filament current supply which may be a dry battery or storage battery of approximately 2½ to 6 volts.

Figure 7 illustrates a well known and conventional type of a heterodyne frequency meter comprising a detector, a vacuum tube heterodyne oscillator and a loud speaker. The frequency of the heterodyne oscillator is adapted to be controlled by means of a variable condenser in the circuit which is operated by means of the control knob 60 which in turn carries a graduated dial 61. A pointer 62 serves to indicate the position of the control knob 60 upon the dial 61. The output of the detector and heterodyne oscillator leads to a loud speaker, the opening of which is shown at 63.

The operation of the apparatus of the invention is as follows: The core recovered from a drilling hole which is to be tested is first placed in a lathe or other suitable apparatus and turned down to a true cylindrical form having a diameter slightly less than the inside diameter of the opening through the tube 17, as shown at 25. The turned core sample is also provided with centers at either end to receive the points of the supporting pivots 22 and 23 and one end of the core sample is also provided wth a suitable slot into which the spade 36 carried on the pivot 22 may be inserted. The core sample to be tested is then placed between the supporting pivot points 22 and 23, as shown in Figure 1, and dial 38 is placed upon the top end in a known angular position with respect to a reference point which may be marked upon the core sample.

The oscillatory circuit is next energized by connecting the suitable current sources to the terminals B—, B+ and A, as before mentioned and the variable condensers $C_1$ and $C_2$ adjusted for steady oscillation of the circuit at any convenient frequency within its range as determined by the constants of the inductance 10—11 and condensers $C_1$ and $C_2$. Under such oscillating conditions a high frequency alternating electromagnetic field is generated through the inductance 10—11 and by reason of the position of the core sample 25 intermediate the two sections 10 and 11 of this inductance, the high frequency alternating field passes through the central portion of the core sample. The core sample is thus subjected to the influence of the high frequency electromagnetic field from the inductance 10—11. Since the impedance of the inductance 10—11 is dependent in part upon the permeability of the path through which the high frequency electromagnetic field passes any variation in such permeability will consequently cause a variation in said impedance. Therefore, if the core sample, as shown at 25, under test is anisotropic with respect to its permeability a rotation of this core sample by means of the hand wheel 35 acting through the pivot 22 will cause a corresponding variation in the permeability of the magnetic path between the two sections 10 and 11 of the inductance. Such variation in permeability of the magnetic path will then result in a corresponding variation in the effective impedance of the inductance 10—11 which will in turn result in a corresponding variation in frequency of the vacuum tube oscillatory circuit of which the inductance 10—11 forms a controlling part. In testing the core sample 25 in this manner it is imparted slow or intermittent rotation by means of the hand wheel 35. During such slow or intermittent rotation of the core sample the heterodyne frequency meter of Figure 7 is constantly adjusted by means of control knob 60 to a zero beat frequency with the oscillator circuit of the test instrument. As the core sample 25 is continued to be rotated the slight deviation in frequency of the oscillatory circuit caused thereby will be indicated by heterodyne in the heterodyne frequency meter of Figure 7. During the slow rotation of the core sample 25 the heterodyne frequency meter may be maintained at all times at zero beat frequency with the oscillator of the test apparatus by constant adjustment by means of the control 60. The varying position of the control 60 is indicated by means of the pointer 62 upon the dial 61. The corresponding positions of the core sample 25 are indicated by means of the pointer 43 upon the graduated dial 38. The corresponding readings of the two dials 38 and 61 may, for convenience, be plotted on cross section paper as illustrated in Figure 8 in which the abscissa is plotted in degrees of the rotational position of the core sample 25 as indicated on dial 38 and the ordinate is plotted in degrees of rotation of the frequency meter control 60 as indicated on the dial 61. In a typical core sample the resultant graph appears as a curve having substantially sine wave form, as shown at 65. The peaks of the curve 65 as shown, for example, at an angular position of the core sample of approximately 63° and 243° are indicative of the planes of minimum permeability while the valleys indicated at approximately 153° and 333° are indicative of the planes of maximum permeability. These planes of maximum permeability are, obviously, 180° apart and the same is true of the planes of minimum permeability. Therefore, we find as indicated in Figure 8 two positions of maximum and two positions of minimum frequency of the oscillator per revolution of the core sample.

Having thus arrived at the angles of maximum and minimum permeability of the core sample 25, as rotated about the centers 22 and 23, the said core sample 25 may be suitably marked in accordance with the indications of the dial 38 to indicate thereon such determined planes of maximum and minimum permeability.

During the core testing operations, as hereinbefore described, the heterodyne frequency meter M should be placed at the maximum possible distance from the oscillator of the core testing apparatus at which the stray radiated high frequency field is still of sufficient strength to be picked up by the frequency meter detector and the resulting heterodyne audibly reproduced in the loud speaker. This stray field in general is quite weak due to the metal shielding provided by the enclosures of both the core testing oscillator and the heterodyne frequency meter.

When testing core samples having strongly defined anisotropic magnetic permeabilities it is possible at times to merely set the heterodyne frequency meter in such a manner as to produce an audible beat of any suitable frequency, say for example a frequency of 50 to 100 cycles per record and then while rotating the core sample in the test instrument to simply observe the points as indicated on the dial 38 where the varying beat frequency reaches a minimum and maximum, without further adjustment of the frequency meter.

In general it is desirable to employ an oscillator circuit in the core testing instrument which has constants such as to produce frequencies in the neighborhood of from 100 to 10,000 kilocycles. The instrument is most sensitive in the higher range of frequencies.

When the core sample contains drilling fluid or connate water which is highly conductive it is desirable to bake the core sample at a relatively high temperature for a time sufficient to remove substantially all of the moisture prior to making the hereinbefore described electrical tests.

The foregoing is merely illustrative of one preferred method and embodiment of the invention and is not to be limited thereby but may include any method and apparatus which accomplishes the same within the scope of the claims.

I claim:

1. A method for determining the magnetic anisotropy of earth core samples comprising placing a core sample in inductive relation to an electrical circuit, varying the angular position of said core sample with respect to said electrical circuit and correlating the relative variations of impedance of said electrical circuit effected thereby with the varied angular positions of said core sample, and locating therefrom an axis of electrical anisotropy of said core sample.

2. A method for determining the magnetic anisotropy of earth core samples comprising placing a core sample in inductive relation to an inductance coil, varying the angular position of said core sample with respect to said inductance coil and correlating the relative variation of the apparent value of the impedance of said coil effected thereby with the varied angular position of said sample, and locating therefrom an axis of electrical anisotropy of said core sample.

3. A method for determining the magnetic anisotropy of earth core samples comprising subjecting said core sample to a high frequency alternating electromagnetic field, varying the angular position of said core sample with respect to said field and correlating the relative changes in the character of said field effected thereby with the varied angular positions of said core sample and determining therefrom the axis of electrical anisotropy of the core sample.

4. A method for determining the magnetic anisotropy of earth core samples comprising subjecting said core sample to the magnetic field from a high frequency pulsating electric current, varying the angular position of said core sample with respect to said magnetic field and correlating the relative changes in the character of said current effected thereby with the varied angular positions of said core sample, and determining therefrom the axis of minimum and maximum magnetic permeability.

5. A method for determining the magnetic anisotropy of earth core samples comprising placing a core sample in inductive relation to an inductance coil, varying the relative angular position of said core sample with respect to said inductance coil and effecting variation in the effective impedance of said coil thereby, energizing said coil with high frequency pulsating electric current from a source, the frequency of which is a function of the impedance of said coil and correlating the variations of the frequency of said current with the varied angular positions of said core sample and determining therefrom an axis of magnetic anisotropy of said core sample.

6. Apparatus for determining the magnetic anisotropy of earth core samples comprising an electrical conductor, means to rotate a core sample adjacent said conductor, and means to indicate a change in impedance of said conductor caused by rotation of said core sample.

7. Apparatus for determining the magnetic anisotropy of earth core samples comprising an electrical conductor in the form of a coil, means to rotate a core sample within the field of said coil and means to indicate a change in impedance of said coil caused by rotation of said core sample.

8. Apparatus for determining the magnetic anisotropy of earth core samples comprising a coil, means to rotate a core sample within the field of said coil, means to energize said coil with a high frequency pulsating electric current, whereby said core sample may be subjected to a pulsating electromagnetic field of corresponding frequency and means to indicate a change of frequency of said high frequency energizing current which may be caused by rotation of the core sample.

9. Apparatus acocrding to claim 8 in which the means to energize said coil comprises a vacuum tube oscillator of which the said coil is a freqeuncy controlling part.

10. Apparatus according to claim 7 wherein the conductor coil is divided into two separated sections and a rotatable mounting is provided to rotatably position a core transversely of the coil and between the coil sections.

LYLE DILLON.